United States Patent [19]

Desfontaines

[11] Patent Number: 4,472,348

[45] Date of Patent: Sep. 18, 1984

[54] OPERATING DEVICES FOR CONTROL RODS IN A NUCLEAR REACTOR

[75] Inventor: Guy Desfontaines, Paris, France

[73] Assignee: Framatome, Courbevoie, France

[21] Appl. No.: 223,975

[22] Filed: Jan. 12, 1981

[30] Foreign Application Priority Data

Feb. 12, 1980 [FR] France .................................. 80 03087

[51] Int. Cl.³ .............................................. G21C 7/12
[52] U.S. Cl. .................................... 376/228; 376/233;
 294/88; 74/89.15
[58] Field of Search ............... 376/224, 228, 233, 235,
 376/268; 294/86 A, 88; 74/89.15, 424.8 R

[56] References Cited

U.S. PATENT DOCUMENTS

| | | | |
|---|---|---|---|
| 2,780,740 | 2/1957 | Roman et al. | 310/78 X |
| 2,812,455 | 11/1957 | Noe et al. | 310/83 |
| 2,857,537 | 10/1958 | McCown et al. | 310/83 |
| 3,408,101 | 10/1968 | Savary | 376/233 |
| 3,585,869 | 6/1971 | Lemor | 74/89.15 |
| 3,730,008 | 5/1973 | Sheesley | 74/89.15 |
| 3,941,413 | 3/1976 | Johnson et al. | 294/88 X |
| 3,959,071 | 5/1976 | Bevilacqua | 376/228 |
| 4,314,882 | 2/1982 | Etienne et al. | 376/235 |

FOREIGN PATENT DOCUMENTS

| | | | |
|---|---|---|---|
| 1290265 | 3/1969 | Fed. Rep. of Germany | 376/233 |
| 1539647 | 1/1970 | Fed. Rep. of Germany | 376/268 |
| 1241783 | 8/1960 | France . | |
| 1450728 | 7/1966 | France . | |
| 927522 | 5/1963 | United Kingdom | 376/233 |

OTHER PUBLICATIONS

Drawing Labeled "Prior Art".
Drawing Labeled "German Das 1,290,265".

Primary Examiner—Richard E. Schafer
Assistant Examiner—Daniel Wasil
Attorney, Agent, or Firm—Pollock, Vande Sande & Priddy

[57] ABSTRACT

A device for providing translatory movement of the control rods inside the closed vessel of a nuclear reactor. The rotor of the drive motor for a screw/nut assembly has fixed to it two pivoting arms formed in the poles of the rotor, and these serve as latching members which keep the screw in its raised position. A tubular casing locks these arms in the opened position while the screw is being raised after the control rod has been allowed to fall into the core of the reactor.

2 Claims, 2 Drawing Figures

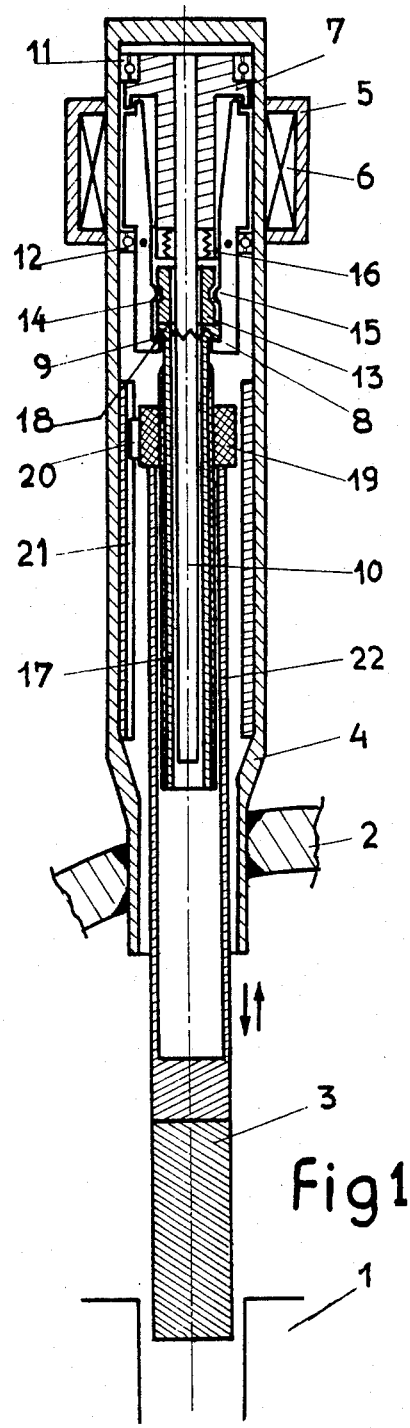
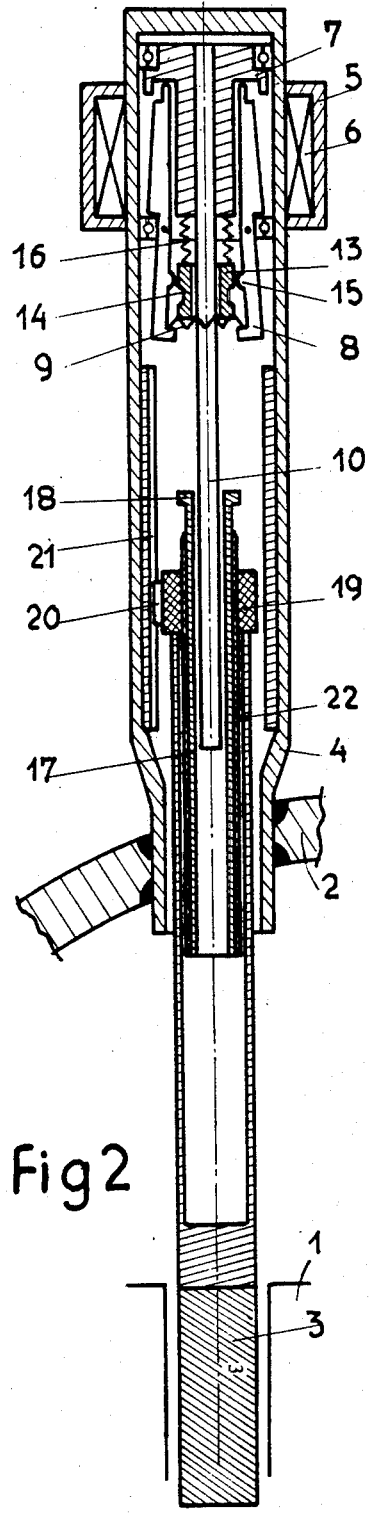

OPERATING DEVICES FOR CONTROL RODS IN A NUCLEAR REACTOR

BACKGROUND OF THE INVENTION

The present invention relates to improvements in devices which regulate the movement of control rods within the closed vessel of a nuclear reactor.

It is known that the reactivity of a nuclear reactor is generally regulated by regulating the insertion, within the core of the same, of control rods which have the property of absorbing neutrons, and slow variation in the level of insertion of these rods makes it possible to control the power level supplied by the core, and complete and rapid insertion of these makes it possible to shut down the reactor rapidly.

These slow movements of the rods are generally carried out using devices employing male and female threaded members, the nut member being locked in rotation and the screw member being locked in its translatory movement. Such devices are, for example, described in French Pat. Nos. 1,241,783 and 1,450,728 and include, among other provisions, a mechanism which makes it possible to carry out rapid insertion of the control rod by disengaging the screw/nut assembly, with the nut being left continuously in engagement with the screw.

These known devices use a device such as a grab or a hook for supporting, when in the closed position, the screw/nut assembly, and this is actuated by an electromagnet the coil of which is located under the stator of the motor provided for rotating the screw portion of the said screw/nut assembly. Rapid insertion of the control rod into the core of the reactor is obtained by shutting off the electrical supply to the coil of the electromagnet, which leads to opening of the grab arrangement, freeing of the screw/nut assembly, and, as a result of this, release of the control rod which falls into the core of the reactor until it reaches its position of maximum insertion.

This known arrangement, however, suffers from one disadvantage. This consists in the fact that safetly rules applicable to nuclear reactors lay down that in case of earthquake it must be, firstly, possible to carry out rapid insertion of the control rod and, secondly, that the vessels providing for retention of the primary fluid remain intact. However, the presence of supplementary pole pieces and windings, located under the stator of the motor for driving the screw, causes the mechanism to be greater in length and heavier than desirable, which has the effect of increasing the stresses and deformations to which this mechanism might be subject under earthquake conditions.

SUMMARY OF THE INVENTION

The device according to the invention makes it possible to overcome this disadvantage and also provides the additional advantage of simplifying the mechanism. It is characterised in that the rotor of the motor for driving the screw or equivalent is further provided with hooking means for supporting the said screw in its raised position, the said hooking means being controlled by electro-magnetic action originating from the windings of the stator of the said drive motor, so that the said means are in their closed position on the said screw, or equivalent, when the said stator is supplied with power, and that they change to the opened position when the said stator is no longer supplied with power so as to allow the complete assembly of the screw/nut type to fall, and in that it includes a locking member for the said hooking means which assures that the latter are held in the open position when the said operating screw or equivalent is no longer supported in its raised position.

BRIEF DESCRIPTION OF THE DRAWING

The invention will be better understood from the description which follows of one embodiment, with reference to the attached drawings in which:

FIG. 1 is a diagrammatical view of the operating device for a control rod with the screw held in its upper position.

FIG. 2 shows the same device with the rod at its lowermost position, the screw having been released.

DETAILED DESCRIPTION OF AN EMBODIMENT

With reference to FIG. 1, there are shown, diagrammatically, at 1 the core of the nuclear reactor, at 2 its pressurised vessel and at 3 one of the control rods. The mechanism for operating the rod 3 is, in the conventional way, enclosed in a vessel under pressure 4 having the form of a tube which is closed at the top to assure retention of the primary fluid. According to the invention, this mechanism comprises:

(a) a variable reluctance stepping motor 5 having its stator 6 arranged externally of and around the enclosure 4, the rotor 7 being located, in the convention way, inside the said enclosure. According to the invention, the central core of the rotor 7 supports two pivoting arms 8 on which the poles of the said rotor are formed. The arms 8 form a type of clip which tends to become opened by a spring 9 located at its lower end. Correct location of the parts of the mechanism which rotate on the inside portion of the enclosure 4 is provided for using ball races (11, 12).

(b) also coupled to the rotor 7, a fluted rod 10, which lies on the vertical axis of the mechanism and has a length which is greater than the path of the control rod 3.

(c) slidably mounted on the fluted rod 10 so as to rotate along with it, a tubular casing 13 having a notches 14 with which corresponding detents 15 on the lower portion of the arms 8 engage, when the clip constituted by the latter is closed. The tubular casing 13 is connected to the rotor 7 by a spring 16 which urges it in the downward direction.

(d) a screw 17 slidably mounted on the fluted shaft 10 in such a way as to remain, as was the case with the tubular casing 13, permanently in engagement with it. In the position shown in FIG. 1 for regulating the reactivity of the reactor, this screw 17 is locked and prevented from moving in the axial sense by the arms 8 which engage with it at its upper end where it is consequently provided with a flange 18.

(e) a nut 19 which is in engagement with the screw 17, which is free to move in the axial sense and is prevented from rotating by a key 20 which slides in a longitudinal keyway 21.

(f) a tubular operating rod 22 which connects the nut 19 to the control rod 3.

Operation of the device will now be described, and for the purposes of comprehension reference should also be made to FIG. 2:

When power is supplied to the stator 6 of the stepping motor 5, the former attracts the upper portion of the pivoting arms 8, which makes it possible to keep, making use of its flange 18, screw 17 in its raised position.

In order to carry out flow displacement of the rod 3, power is supplied to the windings 6 so as to create a rotating field in the stator, which causes rotation of the rotor 7 which brings about, via the fluted shaft 10, rotation of the screw 17. The nut 19, which is unable to rotate, then moves longitudinally along the screw 17, which itself is unable to move in the axial sense, causing slow insertion or slow extraction of the rod 3, which is coupled to the shaft by means of the tubular operating rod 22.

During the course of these operations, as can be seen in FIG. 1, the tubular casing 13 which provides the locking arrangement is in its raised position, the spring 16 is compressed and the detents 15 are engaged in the notches 14 so as to allow the pivoting arms 8 to close together and keep the screw 17 in its raised position. Rapid insertion (FIG. 2) of the control rod 3 into the core 1 of the reactor is obtained by cutting off the electrical supply to the stator 6 of the stepping motor 5. As a result of the action of spring 9, and the weight of the assembly constituted by the screw plus the nut plus the operating rod plus the control rod, the pivoting arms 8 open and free the assembly constituted by the screw 17, the nut 19, the operating rod 22 and the control rod 3. The control rod 3 then falls into the core to reach its position of maximum insertion, which causes closedown of the reactor. At the time of opening of the arms 8, the tubular casing 13, which is now released from the hold of the detents 15, descends under the action of the spring 16, which, as can be seen in the drawing, locks the arms 8 in their open position.

Subsequent raising of the control rod 3, following rapid insertion, necessitates prior raising of the screw 17. The provision of the fluted shaft 10, which remains in engagement with the screw 17, makes this possible, even when the acrew is in its lowermost position. It is then a case of causing the motor to rotate in the sense which normally leads to lowering of the control rod 3, and this brings about raising of the screw 17. It should be noted that supplying power to the stator 6 of the motor 5 does not cause the arms 8 to swing, since these are locked in their open position by the locking tubular casing 13.

When the screw 17 arrives at its raised position, its upper portion comes into contact with the lower face of the tubular casing 13 and pushes the latter upwards, while the spring 16 becomes compressed. When the notch 14 formed on the tubular casing 13 arrives at a position where it is in line with the detents 15, the pivoting arms 8 close together as a result of the force of attraction exercised by the stator 6 on the upper portion of these pivoting arms. The screw 17 is consequently now in a position where it is immobilized in the axial sense, and it is now possible once again to control the performance of slow displacements of the control rod 3 as a result of rotation of the motor 5.

The invention is intended for use in the field of production of energy by a nuclear reactor.

I claim:

1. Device for a control rod in a nuclear reactor of the type comprising a sealed tubular enclosure associated with a variable reluctance stepping drive motor the rotor of which is situated inside the said enclosure and the stator of which is located externally of the latter, rotation of said motor bringing about raising or lowering of said control rod via a transmission means of the screw/nut type, said device having hooking means for hooking said screw in its raised position, said hooking means being controlled by at least one electromagnetic spool surrounding said enclosure, so that said means are in their closed position on said screw when said spools are supplied with power, said means moving to opened position when no longer supplied with power so as to allow the complete assembly of the screw/nut type to fall, said hooking means comprising an integral part of the poles of the rotor of said motor, said electromagnetic spools being constituted by the spools of the stator of said motor, and comprising means for locking said hooking means allowing them to remain in open position even when said spools are again placed under tension when said screw is not in its upper, hooking position.

2. Device according to claim 1, wherein said hooking means comprise pivoting arms on which the poles of the rotor are formed and said locking means comprises a tubular casing which is co-axial with respect to said transmission arrangement and which is provided with at least one notch for engagement with at least one projecting portion on the lower part of said pivoting arms.

* * * * *